Figure 1:
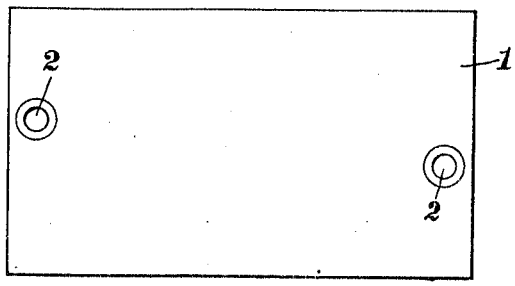

J. O'BRIEN.
MEANS FOR MOLDING RUBBER PADS FOR BOOTS AND SHOES.
APPLICATION FILED OCT. 26, 1908.

945,340.   Patented Jan. 4, 1910.

Witnesses:
L. E. Barkley
E. G. Gibbs

Inventor:
John O'Brien,
by Frank S. Appleman
Atty.

UNITED STATES PATENT OFFICE.

JOHN O'BRIEN, OF WIMBLEDON, ENGLAND.

MEANS FOR MOLDING RUBBER PADS FOR BOOTS AND SHOES.

945,340. Specification of Letters Patent. Patented Jan. 4, 1910.

Application filed October 26, 1908. Serial No. 459,615.

*To all whom it may concern:*

Be it known that I, JOHN O'BRIEN, a citizen of the United Kingdom of Great Britain and Ireland, and resident of 103 Woodside, Wimbledon, in the county of Surrey, England, have invented certain new and useful Improvements in Means for Molding Rubber Pads for Boots and Shoes, of which the following is a specification, such as will enable others skilled in the art to which it appertains to make and use the same.

My invention relates to the molding of rubber pads for boots and shoes and has for its object improved means whereby such molding may be effected so that the rubber of the pad may be compressed and the usual securing plate more or less enveloped thereby. With this object I so construct the molds employed for molding such pads that after each of these has been filled with rubber composition and the metal securing plate either placed on the top of such compound or beneath it as the case may be and the mold closed, a plunger working through the top or bottom of the mold may be forced into its interior to such an extent as to compress the rubber therein and at the same time force the metal securing plate upward or downward as the case may be to such an extent as to cause it to be more or less enveloped according to the size of the plunger. The preferred construction of such a mold is that in which the plunger works through the top thereof and in this case the sides of the mold may either be in combination with the bottom or the top thereof. In the former case the mold will require to be filled with rubber composition, the metal plate placed thereon, and the lid secured before the mold is placed in the vulcanizing press and the plunger operated, while in the latter case the mold would be first reversed, then the securing plate placed therein on the end of the plunger, then the composition, and finally after the bottom had been secured in position the mold again turned before being placed in the vulcanizing press and the plunger operated.

Hitherto in the manufacture of india rubber heels of the kind referred to the method adopted has been to place the rubber compound into the molds which are usually made in sets of various numbers in one bed plate and to place this bed plate with the molds in it into the vulcanizer the top plate of which is screwed or otherwise forced down onto the top of the rubber and left in this position until the curing or vulcanizing is finished. It is found however in this process that immediately the heated plate of the vulcanizer reaches the rubber and presses suddenly upon it the rubber spews out between the top plate and the bed plate and forms fins around the article being molded which fins have to be removed after the articles are taken from the molds. The removal of these fins is usually done by hand and much work is entailed thereby, in addition to which the material in the fins is little or no better than scrap india rubber and consequently considerable labor and much waste are involved.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 2:
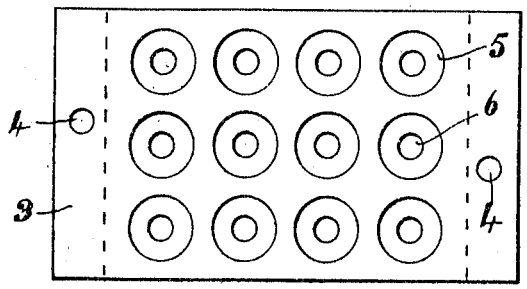
Figure 3:
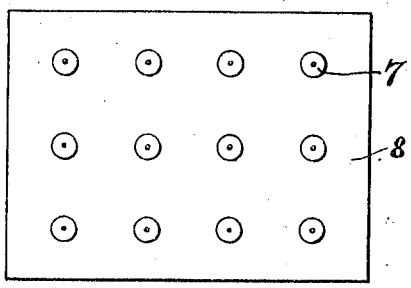
Figure 4:
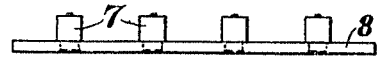
Figure 5:
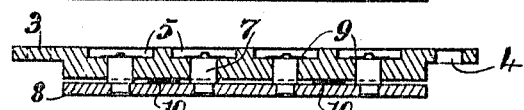
Figure 6:
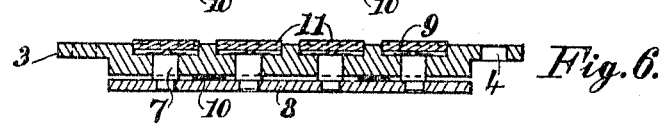
Figure 7:
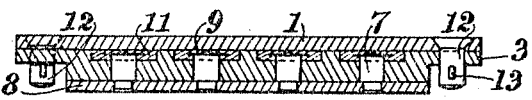

Figure 1, illustrates a top plan view of the pressure plate; Fig. 2, illustrates a plan view of a bed plate; Fig. 3, illustrates a plan view of a plunger plate; Fig. 4, illustrates a side elevation of the said plunger plate with the plungers applied thereto; Fig. 5, illustrates a vertical sectional view of the bed plate and the plunger plate in assembled relation; Fig. 6, illustrates a view similar to Fig. 5, except that the material has been applied to the molds; and Fig. 7, illustrates a vertical sectional view of the top plate, bed plate and plunger plate in assembled relation.

In these drawings 1, indicates a pressure plate having bolt holes 2, therein, and 3, denotes a bed plate having holes 4, adapted to coincide with the holes 2, in the top pressure plate in order to receive a bolt 12, having a fastening device 13, by which the pressure plate and bed plate are connected during the operation of the apparatus. The bed plate is provided with a series of molds 5, having central apertures 6, designed to receive the plungers 7, projecting from the plunger plate 8.

As shown in Fig. 5, the plunger plate is placed under the bed plate and the plungers project through the opening 6, in the said plunger plate and into the molds 5. The plungers are designed to support disks 9, but in Fig. 5, I show spacing bars interposed between the plunger plate and the bed plate in order that the disks 9, applied to the plungers may not be lifted above the lower walls of the molds until the parts have been arranged in proper positions and the material 11, to be vulcanized or molded has been applied to the molds. When the molds have been filled as shown in Fig. 6, the top pressure plate is applied to press the material in the molds and at the same time the spacing bars have been removed and the plunger plate has been permitted to move into contact with the bed plate, thus projecting the plungers into the molds and carrying the disks 9, into the material contained in the molds. By this arrangement the disks are embedded in the material and as the pressure plate and bed plate are clamped together, the material contained in the mold is allowed to harden or set, while the disks are embedded in the said material after which the parts of the mold are disassembled and the operation may be repeated.

What I claim and desire to secure by Letters Patent is:—

1. A mold for molding heel pads comprising a bed plate having molds therein and apertures communicating with the molds, a plunger plate having plungers therein projecting through the apertures of the bed plate, said plungers being adapted to carry disks; and means for holding the bed plate and plunger together.

2. A mold for molding heel pads consisting of a pressure plate, a bed plate having molds therein with apertures communicating with the molds, a plunger plate having apertures, plungers having reduced ends fitting in the apertures and having their outer ends adapted to enter the apertures of the bed plate, and means for clamping the pressure plate and bed plate together.

3. In a mold for molding heel pads, a pressure plate, a bed plate having molds with apertures communicating with the molds, a plunger plate having apertures, plungers having reduced ends fitting in the apertures, said plungers being adapted to project into the apertures of the bed plate when the plunger plate is in engagement with the bed plate whereby disks carried by the plungers may be projected into the molds.

In witness whereof I have hereunto set my hand in presence of two witnesses.

JOHN O'BRIEN.

Witnesses:
H. D. JAMESON,
A. NUTTING.